United States Patent
Maruyama et al.

(10) Patent No.: US 7,099,243 B2
(45) Date of Patent: Aug. 29, 2006

(54) OPTICAL PICKUP APPARATUS, OPTICAL DISC APPARATUS, AND TRACKING CONTROL METHOD THEREOF

(75) Inventors: Tsutomu Maruyama, Chiba (JP); Masami Yuasa, Chiba (JP)

(73) Assignee: Sony Corporation, Tokyo (JP)

( * ) Notice: Subject to any disclaimer, the term of this patent is extended or adjusted under 35 U.S.C. 154(b) by 438 days.

(21) Appl. No.: 10/475,085

(22) PCT Filed: Apr. 19, 2002

(86) PCT No.: PCT/JP02/03924

§ 371 (c)(1),
(2), (4) Date: Oct. 24, 2003

(87) PCT Pub. No.: WO02/089125

PCT Pub. Date: Nov. 7, 2002

(65) Prior Publication Data

US 2004/0130984 A1    Jul. 8, 2004

(30) Foreign Application Priority Data

Apr. 24, 2001 (JP) .............................. 2001-125521
Aug. 22, 2001 (JP) .............................. 2001-251264

(51) Int. Cl.
*G11B 7/095* (2006.01)

(52) U.S. Cl. ................. 369/44.41; 369/44.37

(58) Field of Classification Search ............ None
See application file for complete search history.

(56) References Cited

U.S. PATENT DOCUMENTS

| | | | |
|---|---|---|---|
| 4,775,968 A * | 10/1988 | Ohsato ................... | 369/44.41 |
| 6,980,496 B1* | 12/2005 | Nagahara et al. ........ | 369/44.41 |
| 7,023,767 B1* | 4/2006 | Wu et al. ................ | 369/44.41 |
| 2001/0000696 A1* | 5/2001 | Kuroda et al. ........... | 369/44.41 |
| 2003/0076756 A1* | 4/2003 | Tsukihashi et al. ...... | 369/44.37 |
| 2003/0090968 A1* | 5/2003 | Miyake .................... | 369/44.11 |
| 2003/0090970 A1* | 5/2003 | Watanabe et al. ........ | 369/44.37 |
| 2005/0163000 A1* | 7/2005 | Nishikawa ............... | 369/44.41 |
| 2005/0180293 A1* | 8/2005 | Ueyama et al. .......... | 369/44.37 |
| 2005/0286360 A1* | 12/2005 | Nakao .................... | 369/44.41 |

FOREIGN PATENT DOCUMENTS

JP    9-288831    11/1997

* cited by examiner

*Primary Examiner*—Thang V. Tran
*Assistant Examiner*—Nathan Danielsen
(74) *Attorney, Agent, or Firm*—Oblon, Spivak, McClelland, Maier & Neustadt, P.C.

(57) ABSTRACT

After making such adjustment that an a main push-pull signal MPP offset can be made zero when a main beam is positioned at the center of a main photoreceptor, using electric signals E and F photoelectrically converted by one of two two-divided side beam photoreceptors and electric signals H and G photo-electrically converted by the other thereof, a side push-pull signal SPP including a constant α is determined for allowing respective (F−αE) and (αH−G) offsets to be made zero and is calculated according to the formula, SPP−(F−αE)+(αH−G). From this SPP signal and the main push-pull signal MPP, a differential push-pull signal DPP is then calculated, thereby allowing stable tracking control to be carried out, even during recording.

3 Claims, 5 Drawing Sheets

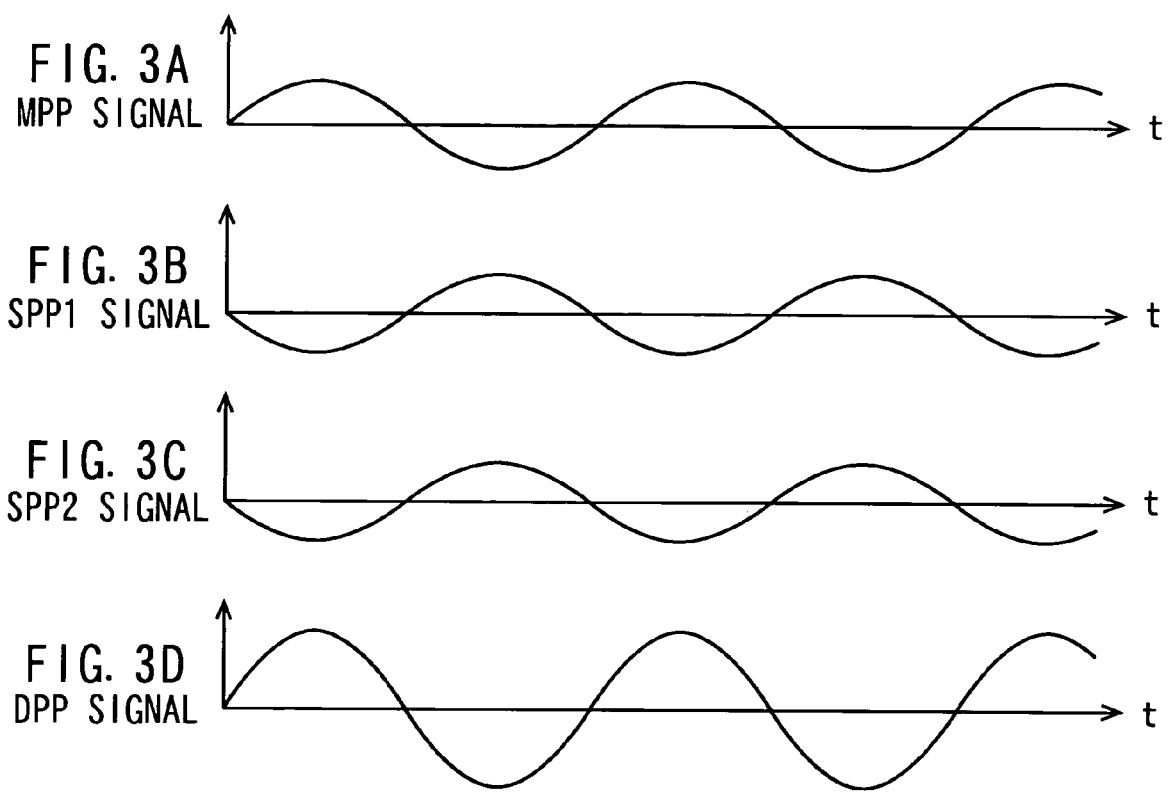

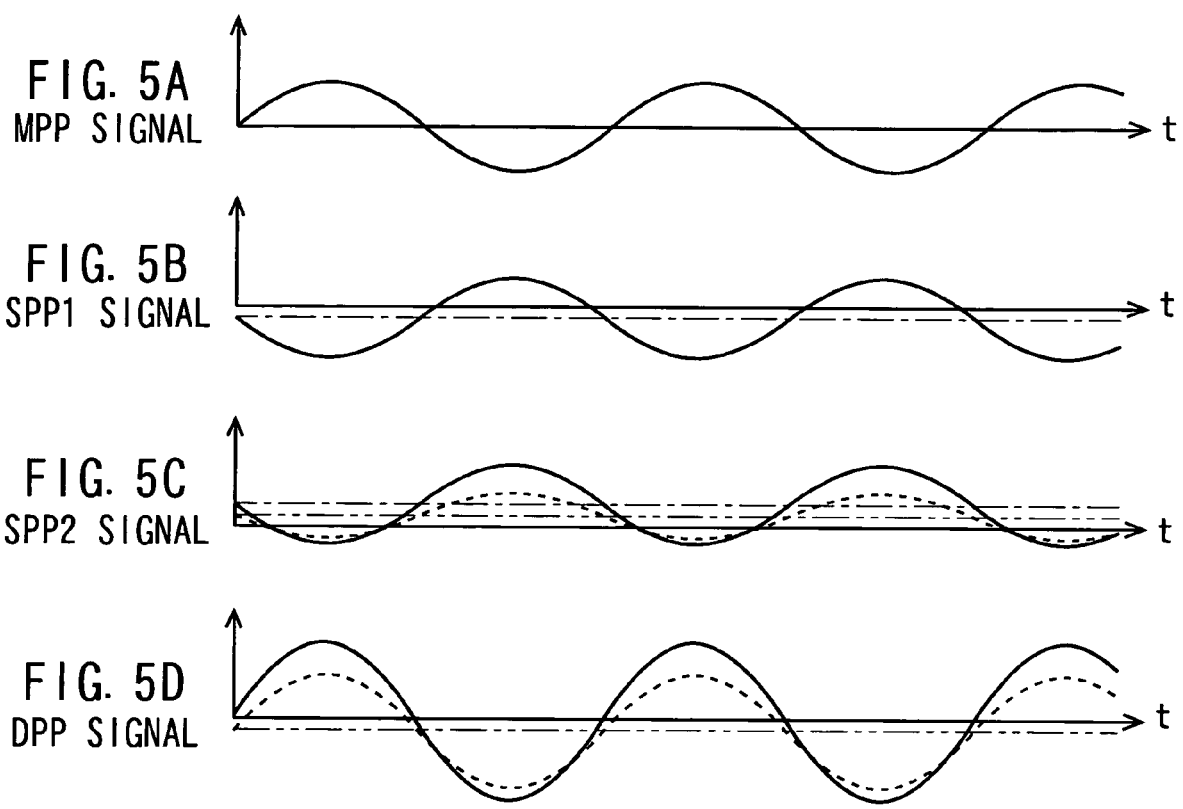
FIG. 5A MPP SIGNAL
FIG. 5B SPP1 SIGNAL
FIG. 5C SPP2 SIGNAL
FIG. 5D DPP SIGNAL

OPTICAL PICKUP APPARATUS, OPTICAL DISC APPARATUS, AND TRACKING CONTROL METHOD THEREOF

TECHNICAL FIELD

The present invention relates to an optical pickup device, an optical disc apparatus using the optical pickup device, and a tracking control method for controlling a tracking for the optical disc apparatus.

The present invention more particularly relates to an optical pickup device and the like wherein if a differential push-pull signal is calculated from a main beam and a pair of side beams, which are reflected from the optical disc, as recording information on an optical disc and/or reproducing the information from the optical disc, the main push-pull signal is adjusted so that an main push-pull offset is made zero when the main beam is positioned at the center of a main photo-detection system and a pair of side beams are positioned at both sides of the main beam with them being symmetrical about the main beam; and then, a constant $\alpha$ is previously set so that offsets of the side push-pull signals are respectively made zero, thereby allowing the offsets of the side push-pull signals to be cancelled even if the side beams fail to be set on the center of photo-detection system, and the stable tracking control to be carried out even at the recording.

BACKGROUND ART

Differential push-pull (DPP) method has been known as one of the tracking servo systems used in a drive apparatus for an optical recording disc such as CD-R and CD-RW.

According to the DPP method, calculation based on output signals from each photoreceptor, which are respectively obtained from the main beam and two side beams, allows a tracking error signal to occur.

Particularly, a beam emitted by a laser diode (light source) 1 forms three beam spots consisting of a spot generated by zeroth-order diffraction light (hereinafter referred to as "main beam 21") and two spots generated by first-order diffraction light (hereinafter referred to as "side beams 22A, 22B") on an optical disc 6 through diffracting means (a diffraction grating) 2, collimator lens 4, and objective lens 5, which are set on a forward course of the emitted beam as shown in FIG. 1.

A center 36 (hereinafter referred to as a "centerline of track") of each track 26 in the optical disc 6 rotationally driven is irradiated with the main beam 21 as illustrated in an illustration encircled by dotted lines shown from A direction in FIG. 1. A disc surface between the track and an advanced adjacent track is irradiated with the side beam 22A, which defines it as an advanced beam. Another disc surface between the track and a subsequent adjacent track is irradiated with the side beam 22B, which defines it as a subsequent beam. Respective photoreceptors of photo-detector 8 receive reflected lights for these beams (according to a theory of tracking).

The photo-detector 8 comprises a main photo-detector (MPD) for receiving a main spot by the main beam 21, side photo-detector (SPD1) for receiving a side spot from the side beam 22A, and side photo-detector (SPD2) for receiving a side spot from the side beam 22B, as illustrated in an illustration encircled by dotted lines shown from B direction in FIG. 1.

In the photo-detector 8, the main photo-detector (MPD) is divided into 4 pieces of elements vertically and horizontally each receiving the main spot by the main beam 21. Respective side photo-detectors SPD1, SPD2 are divided into 2 pieces of elements vertically and the side photo-detector SPD1 receives the side spot by the side beam 22A as well as the side photo-detector SPD2 receives the side spot by the side beam 22B. Incidentally, referring to output signals from the respective divided elements as A, B, C, D, E, F, G, and H, respectively, the calculation based on these signals allows the tracking servo error signal to occur.

The main push-pull signal (MPP) occurs based on the output signal from the MPD. Side push-pull signals (SPP1 and SPP2) occur based on the output signals from the respective SPD1 and SPD2. DPP signals are obtained according to a following operational expression:

$$MPP=(A+D)-(B+C)$$

$$SPP=SPP1+SPP2=(F-E)+(H-G)$$

$$\begin{aligned}DPP &= MPP - K*SPP \\ &= (A+D)-(B+C)-K\{(F-E)+(H-G)\}\end{aligned}$$

where K is a constant set for adjusting a light intensity of the diffraction light of zeroth-order, and plus and minus first-order.

The DPP method has such a drawback that offset occurs in the SPP signal when the side beams 22A, 22b are not positioned at their center of the SPD1, SPD2 and others. If so, two signals SPP1, SPP2 have almost the same amplitude, thereby allowing cancellation of the offset by the addition of these signals at the reproduction. At the recording, however, they have different amplitudes, thereby failing to cancel the offset. This causes the tracking servo error signal including the offset, resulting in some inconvenience that the tracking is unstable, at the worst case of de-tracking thereof, and the less recording performance is delivered.

DISCLOSURE OF THE INVENTION

The present invention is applied to an optical pickup apparatus for recording information on a groove of an optical disc and/or reproducing the information from the groove by irradiating a main beam on the groove, irradiating an advanced side beam on the groove and an subsequent land adjacent thereto. The apparatus comprises a light source, diffracting means for diffracting light emitted from the light source to form a main beam of zeroth-order light, and a pair of side beams of plus and minus first-order lights, the side beams being positioned at both sides of the main beam with the zeroth-order light being fitted between the first-order lights, light receiving means for receiving the main and side beams formed by the diffracting means and reflected by the optical disk, the light receiving means including four-divided main beam photoreceptor for receiving the main beam to photoelectrically convert and a pair of two-divided side beam photoreceptors for receiving the pair of side beams, each for photoelectrically converting, first calculating means for calculating main push-pull signal MPP according to a formula, MPP=(A+D)−(B+C), where A, B, C, and D are electric signals photoelectrically converted by the four-divided main beam photoreceptor included in the light receiving means, second calculating means for calculating side push-pull signal SPP according to a formula, SPP=(F−αE)+(αH−G), where E, and F are electric signals photoelectrically pheteelee4ei4eally converted by one of the two-divided side beam photoreceptors included in the light receiving means, and H, and G are electric signals photoelectrically converted by the other two-divided side beam photoreceptors included in the light receiving means, and third calculating means for calculating a differential push-pull signal DPP including a constant K according to a formula, DPP=MPP−K*SPP, the differential push-pull signal DPP forming a tracking error signal using the main push-pull signal calculated by the first calculating means and the side push-pull signals calculated by the second calculating means.

The constant α is previously set to adjust to making an MPP offset zero when the main beam is positioned at the center of the main photoreceptor and the pair of side beams are positioned at both sides of the main beam with them being symmetrical about the main beam and to adjust to making (F−αE) and (αH−G) offsets zero.

The optical pickup device according to the present invention allows an SPP signal offset to be cancelled by the calculation when the side beams are not positioned at the centers of the SPDs. The optical pickup device for performing stable tracking control during the recording may be implemented.

Namely, according to the invention, since side push-pull signal offset is cancelled with the calculation, stable tracking control may be implemented even when the side beams have different amounts of light to each other during the recording and the other. This allows recording performance (RF jitter or the like in the recorded disc) to be improved. Further, electrically adjusting the SPP signal makes tolerance for justification of optics extended and eliminates the need for a justification mechanism and an adjustment thereof This allows a cost of manufacturing the optical pickup device to be cut.

The invention is also applied to an optical disc apparatus for performing a tracking control on an optical disc based on a differential push-pull signal. The optical disc apparatus comprises driving means for rotationally driving the optical disc, and an optical pickup device for recording information on the optical disc thus rotated by this driving means and/or reproducing the information from the optical disc.

This optical pickup device includes a light source, diffracting means for diffracting light emitted from the light source to form a main beam of zeroth-order light, and a pair of side beams of plus and minus first-order lights, the side beams being positioned at both sides of the main beam with the zeroth-order light being fitted between the first-order lights, light receiving means for receiving the main and side beams formed by the diffracting means and reflected by the optical disc, the light receiving means including a four-divided main beam photoreceptor for receiving and photoelectrically converting the main beam and a pair of two-divided side beam photoreceptors for receiving and photoelectrically converting the pair of side beams, first calculating means for calculating main push-pull signal MPP according to a formula, MPP=(A+D)−(B+C), where A, B, C, and D are electric signals photoelectrically converted by the four-divided main beam photoreceptor included in the light receiving means, second calculating means for calculating side push-pull signal SPP according to a formula, SPP=(F−αE)+(αH−G), where B, and F are electric signals photoelectrically converted by one of the two-divided side beam photoreceptors included in the light receiving means, and H, and G are electric signals photoelectrically converted by the other two-divided side beam photoreceptors included in the light receiving means and third calculating means for calculating a differential push-pull signal DPP including a constant K according to a formula, DPP=MPP−K*SPP, the differential push-pull signal DPP forming a tracking error signal using the main push-pull signal calculated by the first calculating means and the side push-pull signals calculated by the second calculating means.

The constant α is previously set to adjust to making an MPP offset zero when the main beam is positioned at the center of the main photoreceptor and the pair of side beams are positioned at both sides of the main beam with them being symmetrical about the main beam, and to adjust to making (F−αE) and (αH−G) offsets zero.

The optical disc apparatus according to the present invention allows an SPP signal offset to be cancelled by the calculation when the side beams are positioned not at the centers of the SPDs because the above optical pickup device is included in the optical disc apparatus. The optical disc apparatus for performing stable tracking control during the recording may be implemented. Thus, this invention provides inexpensive optical disc apparatus of which the recording performance can be improved.

The invention is further applied to a tracking control method for controlling a tracking in an optical pickup apparatus for recording information on a groove of an optical disc and/or reproducing the information from the groove by irradiating a main beam on the groove, irradiating an advanced side beam on the groove and an advanced land adjacent thereto, and irradiating a subsequent side beam on the groove and an subsequent land adjacent thereto. This method comprises the steps of diffracting light emitted from a light source to form a main beam of zeroth-order light, and a pair of side beams of plus and minus first-order lights, the side beams being positioned at both sides of the main beam with the zeroth-order light being fitted between the first-order lights, irradiating the main and side beams thus formed on the optical disc, and four-divisionally receiving and photoelectrically converting the main beam reflected by the optical disc as well as two-divisionally receiving and photoelectrically converting the pair of side beams, calculating main push-pull signal MPP according to a formula, MPP=(A+D)−(B+C), where A, B, C, and D are electric signals obtained by photoelectrically converting the main beam, calculating side push-pull signal SPP according to a formula, SPP=(F−αE)+(αH−G), where E, F, H, and G are electric signals obtained by photoelectrically converting the pair of side beams, calculating a differential push-pull signal DPP having a constant K according to a formula, DPP=MPP−K*SPP, the differential push-pull signal DPP forming a tracking error signal using the main push-pull signal and the side push-pull signals.

When performing the calculation, the constant α is previously set by adjusting to making an MPP offset zero when the main beam is positioned at the center of the main photoreceptor system and the pair of side beams are positioned at both sides of the main beam with them being symmetrical about the main beam, and then, adjusting to making (F−αE) and (αH−G) offsets zero.

The tracking control method for the optical disc apparatus according to the present invention allows an SPP offset to be cancelled by the calculation when the side beams of the optical pickup device are not positioned at the centers of the SPDs. This permits stable tracking control for the optical pickup device to be implemented during the recording.

Further, according to the invention, since no de-tracking occurs even when the side beams have different amounts of light to each other during the recording and the like, recording performance (RF jitter or the like in the recorded disc)

may be improved. Further, electrically adjusting the SPP signal makes tolerance for justification of optics extended and eliminates the need for a justification mechanism and an adjustment thereof. This allows a cost of manufacturing the optical pickup device to be cut.

BRIEF DESCRIPTION OF THE DRAWINGS

FIG. 3 are diagrams showing waveforms of respective signals in the photo-detector as shown in FIG. 2: FIG. 3A shows a waveform of MPP signal; FIG. 3B shows a waveform of SPP1 signal; FIG. 3C shows a waveform of SPP2 signal; and FIG. 3D shows a waveform of DPP signal.

FIG. 5 are diagrams showing waveforms of respective signals in the photo-detector as shown in FIG. 4: FIG. 5A shows a waveform of MPP signal; FIG. 5B shows a waveform of SPP1 signal; FIG. 5C shows a waveform of SPP2 signal; and FIG. 5D shows a waveform of DPP signal.

BEST MODE FOR CARRYING OUT THE INVENTION

The present invention has been contrived in the above circumstances by adopting a relative simple way to save the inconvenience and an object of the present invention is to provide an optical pickup device allowing stable tracking control to be implemented, which is capable of canceling the offset during the recording when side beams are not positioned at the center of each of the SPDs, an optical disc apparatus using such the optical pickup device, and a tracking control method used for the optical disc apparatus.

The optical pickup device embodying the present invention will be described more in detail with reference to the attached drawings.

Figure 1:
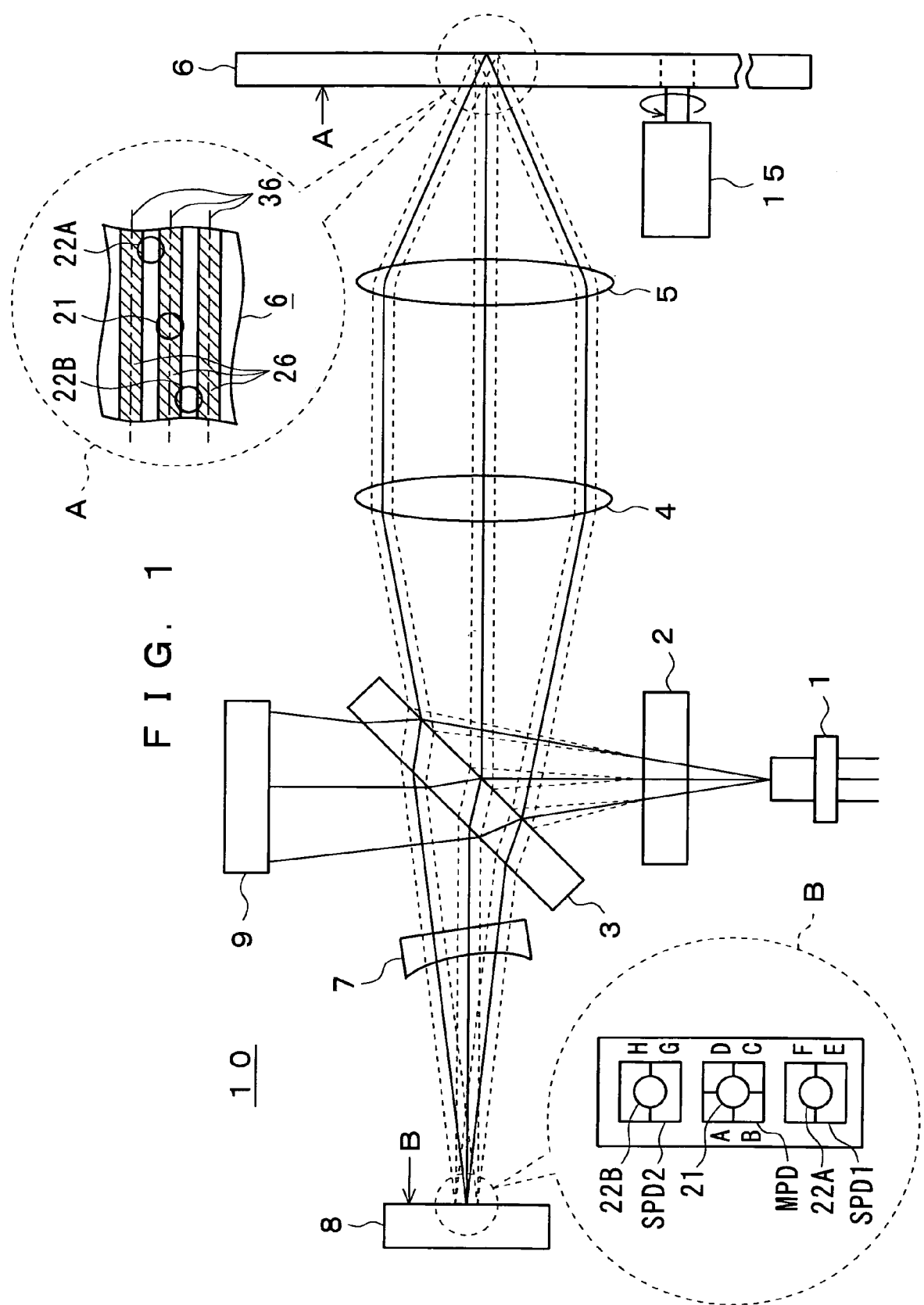
FIG. 1 is a conceptual diagram illustrating a configuration of an optical pickup device embodying the invention.

The optical pickup device 10 as shown in FIG. 1 embodies the present invention and is a device for recording information on a rotationally driven optical disc and/or reproducing the information from the optical disc.

The optical pickup device 10 comprises a laser diode (light source) 1, a diffraction grating 2, a beam splitter 3, collimator lens 4, objective lens 5, optical disc 6, a concave lens 7, a photo-detector 8, a front monitor diode 9, and a driving means 15. The front monitor diode 9 detects a light intensity of the laser diode 1. The driving means 15 drives the optical disc 6 rotationally.

The optical pickup device 10 adapts the DPP method as the tracking servo system. In the apparatus 10, beam light emitted by the laser diode (light source) 1 is divided into one main beam 21 and two side beams 22A and 22B through diffraction means (the diffraction grating 2). The collimator lens converts respective beams to parallel beams so that the respective beams are concentrated on the optical disc 6 via the objective lens 5.

Figure 2:
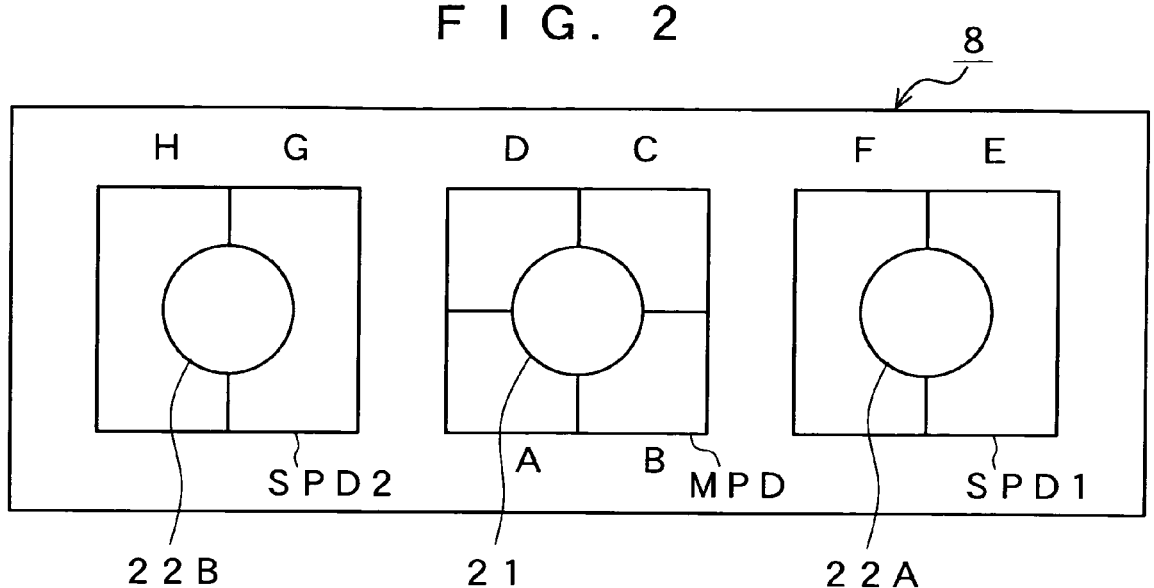
FIG. 2 is a conceptual diagram illustrating a configuration of photo-detector and an ideal example of positional relationship between main beam and side beams.

Return beam light thereof is then concentrated on the photo-detector 8 through the concave lens 7 with the main beam 21 being concentrated on main photo-detector (main beam photoreceptor MPD) and the side beams 22A and 22B being concentrated on side photo-detectors (side beam photoreceptors SPD1, SPD2), respectively, as shown in FIG. 2. Among the signals received by the respective photo-detectors MPD, SPD1, and SPD2, the main beam 21 is used for recording or reproducing the signal and for detecting servo error signal. The side beams 22A, 22B are used for detecting the servo error signal.

According to this tracking servo system, as shown in FIG. 2, the optics such as the diffraction grating 2, the laser diode 1, and the photo-detectors MPD, SPD1, and SPD2 are designed so that they allow the respective beams to focus on each of the centers of the photo-detectors MPD, SPD1, and SPD2. FIGS. 3A through 3D show ideal waveforms of main push-pull (MPP) signal and side push-pull signals (SPP1 and SPP2) in this case. In these drawings, a vertical axis indicates an amplitude of signal and a horizontal axis indicates time, t.

It is conceivable that following two factors make the beam moved off the center of the photo-detector such as MPD, SPD1 and SPD2. First, positional misalignment in a horizontal direction of FIG. 2 in the photo-detector 8 or a shifted amount of the objective lens in a tracking direction is conceived. In this case, the main beam 21 and the side beams 22A, 22B are moved off in the same direction by the same amount of deviation.

Second, it is conceived that a variety of splitting angle of zeroth-order diffraction light and first-order diffraction light based on the positions of the diffraction grating 2 and the laser diode 1 causes different distances between the main beam 21 and the side beams 22A, 22B on the optical disc 6 and the photo-detector MPD. In this case, the side beams 22A, 22B are moved off in the opposite directions on the photo-detectors SPD1, SPD2 by the same amount of deviation with the side beams being symmetric with respect to the main beam 21, as shown in FIG. 4.

FIGS. 5A through 5D respectively show waveforms of MPD, SPP1, SPP2 and DPP signals in this time. In FIGS. 5B through 5D, pedestal levels of respective signals are indicated by chain dash lines and chain double-dash lines. Estimating that solid line of MPP signal (indicated as time axis, t) shown in FIG. 5A is set as reference pedestal level, they indicate positional deviation from the reference pedestal level. An amount of the positional deviation indicates offset. This reference pedestal level is based on a situation where the main beam 21 is irradiated to the centerline of track 36 on the optical disc 6 shown in FIG. 1.

When the side beams 22A, 22B have almost the same amount of light during reproduction or the like, only a positional adjustment of the photo-detector 8 is carried out so that the main beam 21 is positioned at the center of the main photo-detector MPD, thereby canceling the deviation based on the first factor by subtracting SPP signals (SPP1+SPP2) from the MPP signal. The deviation based on the second factor is also cancelled by adding SPP1 signal to SPP2 signal, as indicated by solid lines shown in FIGS. 5B and 5C.

Figure 4:
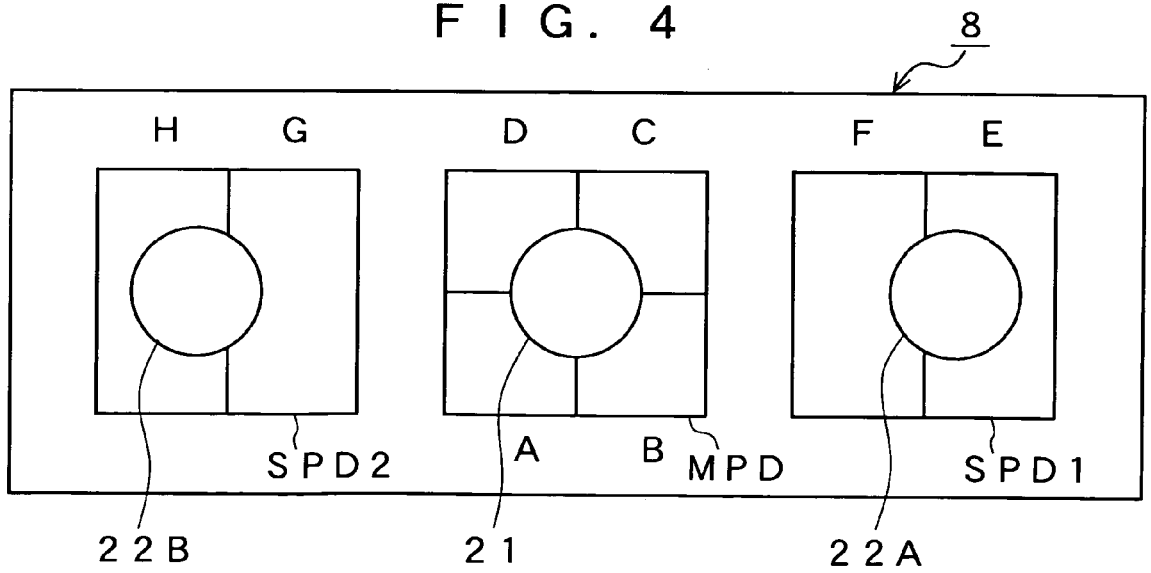
FIG. 4 is a conceptual diagram illustrating a situation that the side beams are moved off in the photo-detector.

Thus, if the side beams 22A, 22B are not positioned at centers of the side photo-detectors as shown in FIG. 4, respective SPP1 and SPP2 signals have the same amount of an offset to be cancelled by a predetermined calculation, thereby resulting in the DPP signal indicated by the solid line of FIG. 5D. Controlling a tracking servo with such the DPP signal prevents the tracking from being unstably carried out.

On the other hand, during the recording, a pit affect subsequent beam such as the side beam 22B but does not affect advanced beam such as the side beam 22A. This causes different amount of light in side spots of the side beams 22A, 22B, thereby resulting in different amplitudes of the SPP1 and SPP2 signals, as shown in FIG. 5B and the dotted line shown in FIG. 5C.

When a deviation occurs according to the first and second factors, the side beams 22A, 22B respectively fail to be positioned at the centers of the side photo-detectors SPD1, SPD2. Thus, if the side beams 22A, 22B have different amount of light, their amounts of offsets are different as a case of combination of the solid line shown in FIG. 5B and the dotted line shown in FIG. 5C, thereby resulting in DPP signal as indicated by the dotted line shown in FIG. 5D. Controlling the tracking servo with this DPP signal causes the failure of de-tracking.

Therefore, in order to avoid an influence of positional deviation of the photo-detector 8, the objective lens 5 is controlled so that an offset of the MPP signal is made zero with the optical disc 6 rotating, the laser diode 1 being generated, and only the focus servo being carried out. Further, under this condition, according to the invention, a calculation system shown in FIG. 6 performs calculations. In this embodiment, it multiplies output from the detector SPD1 by a constant α so that amplitude of electric signal (for example, E signal) converted by one of the side photo-detectors SPD1 divided in two in the side photo-detector 8 can be the same amplitude of electric signal (for example, F signal) converted by the other of the side photo-detectors SPD2 divided in two therein, and then performs the calculation according to a formula, SPP signal=SPP1 signal+SPP2 signal. This allows level adjustmen side photo-detectors, SPD1, SPD2 zero and then the calculation according to a formula, α signal*SPP1 signal+SPP2 signal, to obtain SPP signal.

Figure 6:
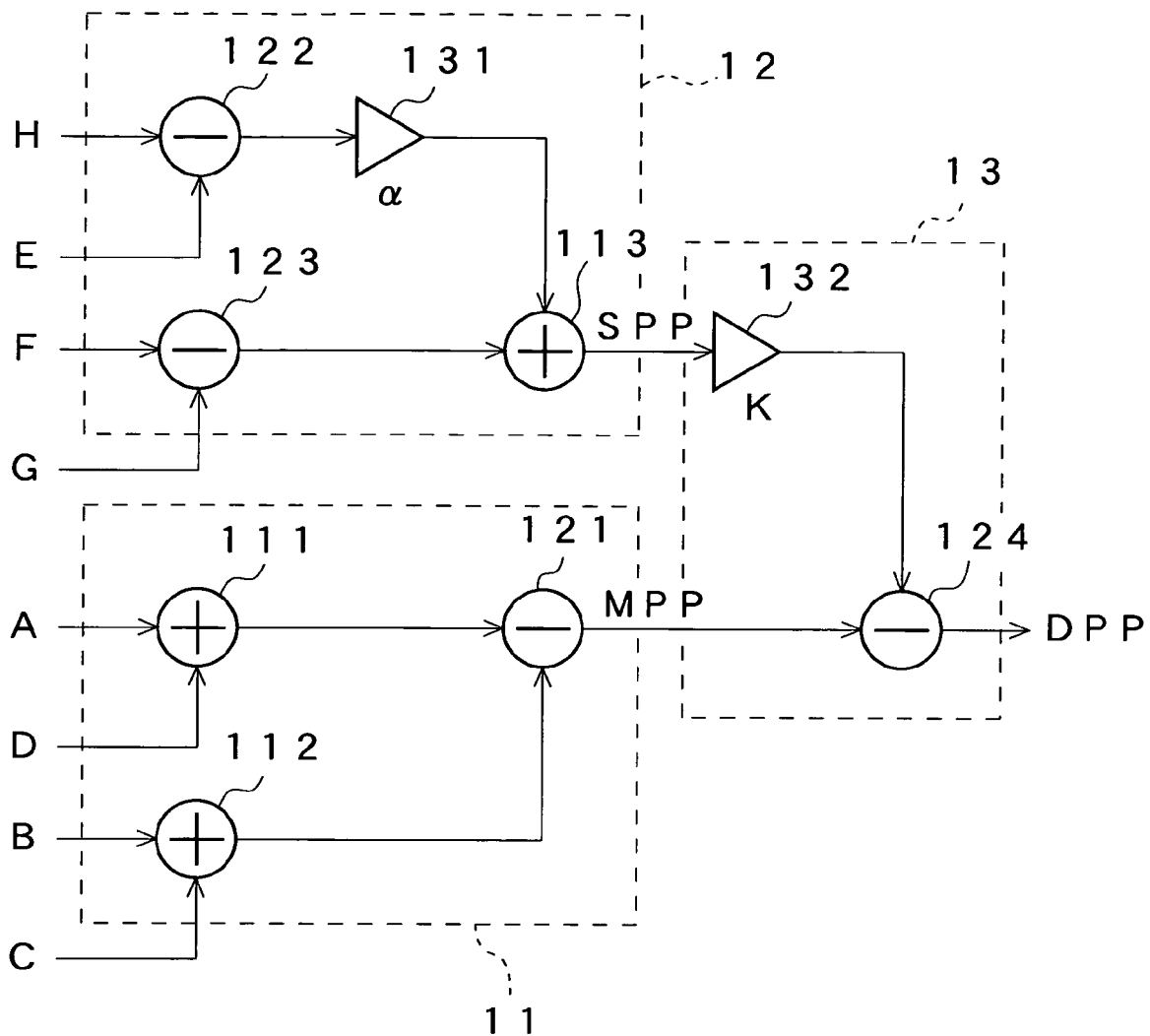
FIG. 6 is a block diagram showing a configuration of a calculation system in the optical pickup device according to the invention.

Referring to FIG. 6, the calculation system comprises adders 111 through 113, subtracters 121 through 124, and constant multipliers 131, 132.

First calculation means 11 includes the adders 111, 112, and the subtracter 121. The first calculation means 11 performs the calculation according to a formula, (A+D)−(B+C) to output MPP signal. For example, the adder 111 adds electric signals A and D; the adder 112 adds electric signals B and C; and the subtracter 121 subtracts electric signal (B+C) from electric signal (A+D).

Second calculation means 12 includes the adder 113, the subtracters 122, 123, and the constant multiplier 131. The second calculation means 12 receives α, F, E, H, and G and performs the calculation according to a formula, SPP=(F−αE)+(αH−G)=(F−G)+α(H−E), to obtain SPP signal. For example, the subtracter 122 subtracts electric signal E from electric signal H; the subtracter 123 subtracts electric signal G from electric signal F; the constant multipliers 131 multiplies electric signal (H−E) by the constant α; and the adder 113 adds electric signal (F−G) and electric signal α(H−E).

Third calculation means 13 includes the subtracter 124 and the constant multipliers 132. The third calculation means 13 receives SPP and MPP signals and performs the calculation according to following formula:

$$DPP = MPP - K*SPP$$
$$= (A+D) - (B+C) - K\{(F-G) + \alpha(H-E)\}$$

to obtain DPP signal. For example, the constant multipliers 132 multiplies SPP signal by the constant K; and the subtracter 124 subtracts K*SPP signal from MPP signal. This allows SPP signal offset to be cancelled by the calculation. If the side beams 22A, 22B have different amount of light, stable tracking servo is performed.

Although the optical pickup device embodying the invention has been described, this invention is also applied to an optical disc apparatus using such the optical pickup device and a tracking control method used for the optical pickup device.

For example, according to the tracking control method for the optical pickup device, if recording information on the optical disc 6 and/or reproducing the information from the optical disc 6, light emitted from the laser diode 1 is first diffracted to form the main beam 21 of zeroth-order light, and a pair of side beams 22a, 22B of plus and minus first-order lights, which are positioned at both sides of the main beam with the zeroth-order light being fitted between the first-order lights.

The main beam 21 and the side beams 22A, 22B are irradiated on the optical disc 6, and the main beam 21 reflected by the optical disc 6 is received by four-divisional way with MPD to photoelectrically convert as well as the pair of side beams 22A, 22B are received by two-divisional way with SPD1 and SPD2, respectively, to pheteeleetefieally photoelectrically convert.

The first calculation means 11 calculates main push-pull signal MPP according to a formula, MPP=(A+D)−(B+C), where A, B, C, and D are electric signals obtained by photoelectorical conversion of the main beam 21. The calculation means 12 calculates side push-pull signal SPP according to a formula, SPP=(F−αE)+(αH−G), where E, F, H, and G are electric signals obtained by photoelectorical conversion of the pair of side beams 22A, 22B. Further, the calculation means 13 calculates the differential push-pull signal DPP that is a tracking error signal, having a constant K according to a formula, DPP=MPP−K*SPP, using the main push-pull signal and the side push-pull signals.

At the time when the above calculation is performed, an adjustment is carried out so as to make an MPP offset zero when the main beam is positioned at the center of the main photoreceptor system (MPD) and the pair of side beams are positioned at both sides of the main beam with them being symmetrical about the main beam. The constant α is then previously set so that (F−αE) and (αH−G) offsets can be made zero.

This allows SPP signal offset to be cancelled by the calculation if the side beams 22A, 22B are not positioned at the centers of SPDs, thereby permitting stable tracking control of the optical pickup device 10 during the recording.

Industrial Applicability

This present invention is useful when it is most preferably applicable to a digital video record and reproduction apparatus such as Audio and Video Disc Recorder (A&VDR) and Digital Versatile Disc-Recorder (DVD-R), which is capable of recording digital video data, digital audio data, and the like on an optical disc and reproducing the data from the optical disc.

The invention claimed is:

1. An optical pickup apparatus for recording information on a groove of an optical disc and/or reproducing the information from the groove by irradiating a main beam on the groove, irradiating an advanced side beam on the groove and an advanced land adjacent thereto, and irradiating a subsequent side beam on the groove and subsequent land adjacent thereto, said apparatus comprising:

a light source;

diffracting means for diffracting light emitted from said light source to form a main beam of zeroth-order light, and a pair of side beams of plus and minus first-order lights, said side beams being positioned at both sides of the main beam with the zeroth-order light being fitted between the first-order lights;

light receiving means for receiving the main and side beams formed by said diffracting means and reflected by the optical disc, said light receiving means including a four-divided main beam photoreceptor for receiving and photoelectrically converting the main beam and a pair of two-divided side beam photoreceptors for receiving and photoelectrically converting the pair of side beams;

first calculating means for calculating main push-pull signal MPP according to a formula, MPP=(A+D)−(B+C), where A, B, C, and D are electric signals photoelectrically converted by the four-divided main beam photoreceptor included in said light receiving means;

second calculating means for calculating side push-pull signal SPP according to a formula, SPP=(F−αE)+(αH−G), where E, and F are electric signals photoelectrically converted by one of the two-divided side beam photoreceptors included in said light receiving means, and H, and G are electric signals photoelectrically converted by the other two-divided side beam photoreceptors included in said light receiving means; and third calculating means for calculating a differential push-pull signal DPP including a constant K according to a formula, DPP=MPP−K*SPP, said differential push-pull signal DPP forming a tracking error signal using the main push-pull signal calculated by said first calculating means and the side push-pull signals calculated by said second calculating means, wherein the constant α is previously set to adjust an MPP offset to zero when the main beam is positioned at the center of the four-divided main beam photoreceptor and the pair of side beams are positioned at both sides of the main beam and are symmetrical about the main beam by making (F−αE) and (αH−G) offsets equal to zero.

2. An optical disc apparatus for performing a tracking control on an optical disc based on a differential push-pull signal, said optical disc recording information on a groove thereof and/or reproducing the information from the groove by irradiating a main beam on the groove, irradiating an advanced side beam on the groove and an advanced land adjacent thereto, and irradiating a subsequent side beam on the groove and an subsequent land adjacent thereto, said optical disc apparatus comprising:

a light source;

diffracting means for diffracting light emitted from said light source to form a main beam of zeroth-order light, and a pair of side beams of plus and minus first-order lights, said side beams being positioned at both sides of the main beam with the zeroth-order light being fitted between the first-order lights;

light receiving means for receiving the main and side beams formed by said diffracting means and reflected by the optical disc, said light receiving means including a four-divided main beam photoreceptor for receiving and photoelectrically converting the main beam and a pair of two-divided side beam photoreceptors for receiving and photoelectrically converting the pair of side beams;

first calculating means for calculating main push-pull signal MPP according to a formula, MPP=(A+D)−(B+C), where A, B, C, and D are electric signals photoelectrically converted by the four-divided main beam photoreceptor included in said light receiving means;

second calculating means for calculating side push-pull signal SPP according to a formula, SPP=(F−αE)+(αH−G), where B, and F are electric signals photoelectrically converted by one of the two-divided side beam photoreceptors included in said light receiving means, and H, and G are electric signals photoelectrically converted by the other two-divided side beam photoreceptors included in said light receiving means; and third calculating means for calculating a differential push-pull signal DPP including a constant K according to a formula, DPP=MPP−K*SPP, said differential push-pull signal DPP forming a tracking error signal using the main push-pull signal calculated by said first calculating means and the side push-pull signals calculated by said second calculating means, wherein the constant a is previously set to adjust an MPP offset to zero when the main beam is positioned at the center of the four-divided main beam photoreceptor and the pair of side beams are positioned at both sides of the main beam and are symmetrical about the main beam by making (F−αE) and (αH−G) offsets eciual to zero.

3. A tracking control method for controlling a tracking in an optical pickup apparatus for recording information on a groove of an optical disc and/or reproducing the information from the groove by irradiating a main beam on the groove, irradiating an advanced side beam on the groove and an advanced land adjacent thereto, and irradiating a subsequent side beam on the groove and a subsequent land adjacent thereto, said method comprising the steps of: diffracting light emitted from a light source to form a main beam of zeroth-order light, and a pair of side beams of plus and minus first-order lights, said side beams being positioned at both sides of the main beam with the zeroth-order light being fitted between the first-order lights;

irradiating the main and side beams thus formed on the optical disc, and four-divisionally receiving and photoelectrically converting the main beam reflected by the optical disc as well as two-divisionally receiving and photoelectrically converting the pair of side beams;

calculating main push-pull signal MPP according to a formula, MPP=(A=D)−(B=C), where A, B, C, and D are electric signals obtained by photoelectrically converting the main beam;

calculating side push-pull signal SPP according to a formula, SPP=(F−αE)=(αH−G), where E, F, H, and G are electric signals obtained by photoelectrically converting the pair of side beams, wherein when calculating a differential push-pull signal DPP having a constant K according to a formula, DPP=MPP−K*SPP, said differential push-pull signal DPP forms a tracking error signal using the main push-pull signal and the side push-pull signals, and a constant α is previously set by adjusting an MPP offset to zero when the main beam is positioned at the center of the four-divided main beam photoreceptor system and the pair of side beams are positioned at both sides of the main beam and are symmetrical about the main beam making (F−αE) and (αH−G) offsets eciual to zero.

* * * * *